United States Patent Office 2,753,279
Patented July 3, 1956

2,753,279
ION EXCHANGE PURIFICATION OF FRUCTOSE SOLUTION

Ira B. Cushing and Raymond V. Davis, Waukegan, Ill., assignors to Abbott Laboratories, Chicago, Ill., a corporation of Illinois No Drawing. Application July 2, 1954,
Serial No. 441,162

6 Claims. (Cl. 127—46)

This invention relates to purifying solutions of oxidized polyhydric alcohols and more specifically to a method of purifying fructose solutions prepared by fermenting solutions of mannitol with an Acetobacter and to the product thus purified.

It is known that Acetobacter microorganisms produce enzymes which catalyze the oxidation of polyhydric sugar alcohols to the corresponding keto sugars (Iowa State College Journal of Science, 13, 279, 1939). During the process of oxidizing the polyhydric alcohols, such as mannitol, by an Acetobacter an appreciable quantity of color bodies and potential color forming impurities are produced. While it is possible to effectively remove color bodies formed during the fermentation or oxidizing process by treating the solution with a suitable decolorizing carbon, there remains after the said carbon treatment a substantial amount of potential color body formers which cause a marked darkening of the solution when the solution is autoclaved to form a suitable sterile injectable product suitable for pharmaceutical use. And, although crystals of fructose can be obtained from the carbon treated fructose solutions by concentrating and crystallizing from alcohol, when a 10% solution of the crystals thus obtained is autoclaved sufficient to sterilize the said solution, a deep yellow color is formed therein which renders the solution unacceptable for pharmaceutical use. Thus, in order to obtain highly purified pharmaceutically acceptable fructose solutions or crystals of fructose having the required purity from fermentation beer, it is necessary that the fermentation beer be so purified that there is no appreciable color formed when a fructose solution is autoclaved or subjected to a heat treatment sufficient to sterilize the fructose solution.

It is therefore an object of the present invention to provide an improved method of purifying a solution of a fermented polyhydric sugar alcohol.

It is also an object of the present invention to provide an improved method of removing from a solution of an oxidized polyhydric alcohol impurities which are responsible for the formation of color bodies therein.

It is a still further object of the present invention to provide an improved method of improving the color stability of a sugar solution.

It is still another object of the invention to provide an improved method of purifying a fructose solution prepared by oxidizing a solution of mannitol with an Acetobacter and to retard the rate of formation of color bodies therein.

Other objects of the invention will be apparent to those skilled in the art from the detailed description and claims to follow.

The foregoing objects and other objects of the invention are achieved by treating a sugar solution prepared by oxidizing a solution of a polyhydric sugar alcohol, such as mannitol, to the corresponding keto sugar, with a strong cation and a strong anion exchange resin and thereafter subjecting the said deionized solution to a heat treatment, and finally again passing the heat treated deionized sugar solution through a strong anion and a strong cation exchange resin prior to concentrating and/or crystallizing the sugar solution. Thus, whereas a substantial proportion of the low molecular weight impurities formed during fermentation appear to pass through a carbon treatment or the treatment with the cation and anion exchange resins if the solution is not heated between the respective treatments with the pair of ion exchange resins, a remarkable improvement in the color stability of the product is effected by subjecting a fructose or similar sugar solution to a heat treatment, such as autoclaving, before finally passing the fructose solution through the cation and anion exchange resins. If desired, the heat treated deionized sugar solution can be subjected to a plurality of heat and ion exchange treatments, although it is generally unnecessary and uneconomical to repeat the sequence more than once since the solution obtained after passing the deionized and autoclaved solution through the cation and anion exchange resins a second time, ending when treating a fructose solution with the cation exchange resin so as to bring the pH of the solution to a desirable range near the pH of maximum stability of fructose, has substantially all the color forming impurities removed therefrom. During the autoclaving of a fructose solution which has previously been in contact with both the cation and anion exchange resins a bright yellow condensation product is formed which is unexpectedly held by the ion exchange resins, particularly the anion exchange resin, whereas the color forming impurities in a fructose solution which has not been heat treated pass substantially entirely through the ion exchange resins.

The step of heat treating the fermented polyhydric sugar alcohol solutions containing substantial amounts of a sugar, such as fructose, which has preferably been rendered free of color bodies and suspended solids to improve the filtering characteristics thereof, is effected in the preferred form of the invention by introducing the solution in a glass container into an autoclave wherein it is heated for a period of at least about 15 minutes and preferably not substantially in excess of one hour at a temperature of at least about 100° C. and below a temperature at which substantial loss of fructose occurs. While it is preferred to heat the fructose solution for a period of 30 minutes at a temperature of 114° C. in an autoclave under a pressure of about 12 pounds, it is possible to effect the heat treatment at a temperature of 100° C. for a period in excess of one hour. It should thus be understood that by correlating the time with the temperature at which heating or autoclaving is effected, it is possible to have wide variations in both time and temperature and achieve the desired result.

The fructose or other fermentation sugar solution at the time it is subjected to said heat treating step can have a pH of about 8 to 8.5 as provided by passing the solution through a combination of a cation exchange resin followed by an anion exchange resin, or it can have a pH of about 2.2 to 3.0 as produced by passing the solution through the sequence of ion exchange resins comprising a cation exchange resin, an anion exchange resin, and a cation exchange resin or the sequence comprising an anion exchange resin followed by a cation exchange resin. When the sugar solution, such as fructose, has an initial pH of 8 to 8.5, the pH falls rapidly during the heat treatment to a pH of about 3.5 which approximates closely the pH of maximum stability of fructose. Also, a further variation in the ion exchange resin treatment involves using a mixed cation and anion exchange resin bed and passing the sugar solution, such as a fructose solution, through a cation and an anion exchange resin mixed bed. Thus, passing of the solution through the mixed bed before the heat treatment followed by the autoclaving step and a second deionizing treatment with the anion and cation exchange resins is sufficient to substantially remove the objectionable color forming impurities from a sugar solution, such as fructose, which has been oxidized by fermenting with an Acetobacter microorganism.

The cation and anion exchange resins which are particularly useful for the removal of color forming bodies and other impurities from the fermented polyhydroxy alcohol solutions in the present invention are the strongly acidic cation exchange resins and strongly basic anion exchange resins. Among the cation exchange resins of the above type which can be used in the present invention are Amberlite IR-112, Aberlite IR-120, and Dowex 50 which are copolymers prepared by reacting styrene with varying amounts of divinyl benzene and sulfonating the aromatic nucleus. Resins of the foregoing type are prepared in accordance with the process disclosed in U. S. Patent No. 2,366,007. Also useful in the present invention in place of the above resins are the cation exchange resins obtained by condensing an aldehyde, a phenol, and an organic sulfonic acid to give sulfonated polymeric resins, such as Amberlite IR-100, Wofatite K, Duolite C-3, and Duolite C-10. Other resins having the properties of the foregoing strongly acidic cation exchange resins can also be used in the present invention.

The anion exchange resins which can be used in the present invention are the strongly basic anion exchange resins containing quaternary ammonium groups and which thus have the ability of splitting salts in addition to having absorbing capacity for acids. Among the anion exchange resins in the foregoing class which are useful in the present invention are the resins prepared by polymerizing a mixture of styrene and divinyl benzene and thereafter haloalkylating the resulting polymer, such as by treating with chlormethyl methyl ether, and treating the haloalkylated products with a tertiary amine, such as trimethylamine (Dowex I-X8), triethylamine (Amberlite IRA-400), or diethylethanolamine (Amberlite IRA-410), and dimethylethanolamine (Dowex 2), to form quaternary ammonium groups therein. Products prepared in the foregoing manner are sold under such trade names as Amberlite IRA-400, Amberlite IRA-410, Dowex I-X8, Dowex 2, Duolite A-42, and Permutit S-1. More specifically, resins of the type such as Amberlite IRA-400 and Dowex I-X8 can be prepared by the method disclosed in U. S. Patent No. 2,591,573 and the resins of the Amberlite IRA-410 and Dowex 2 type can be prepared according to the method disclosed in U. S. Patent No. 2,614,099. It is also possible to employ in the present invention in place of the previously disclosed anion exchange resins the anion exchange resins which have an aliphatic matrix containing quaternary ammonium groups in addition to tertiary amine groups, such as Duolite A-41. Other strongly basic anion exchange resins which have utility in the present invention are resins which have the quaternary ammonium group as an integral part of the matrix of the resin, as where a weakly basic resin, such as Amberlite IR-4B, is treated with an alkylating agent to transform the primary and secondary amine groups into strongly basic quaternary ammoniums. Those skilled in the art will recognize that other strongly basic anion exchange resins having similar properties can also be used in the present invention.

In establishing a standard for measuring the effectiveness of the purification treatment, it has been determined that a 10% fructose solution having an optical density of about 0.055 or below when examined in a clear 500 ml. or 1 liter glass container under blue light is substantially colorless to the eye. Thus, a limit on the maximum optical density (O. D.) of a 10% solution of fructose suitable for therapeutic use after autoclaving has been arbitrarily set at about 0.055 when examined in a cell of 1 cm. thickness with light having a wave length of 350 m$\mu$.

Another method which can be used for measuring the color density of the fructose solutions is the method which comprises visually examining a 50 ml. sample of a 10% fructose solution in a Nessler tube and comparing the observed color with color standards made from solutions of potassium chloroplatinate and cobaltous chloride contained in identical Nessler tubes. A detailed description of the method of preparing the color standards is given in Standard Methods for the Examination of Water in Sewage (9th ed., 1946) published by the American Public Health Association. Generally, an acceptable fructose solution when examined by the above method will have a color intensity ranging between the said color standard tubes which contain 10 and 15 standard color units, respectively.

It should also be understood that the permissible upper limit for the optical density of an autoclaved solution of the purified fructose syrup before crystallization thereof is higher than is permitted for the autoclaved fructose solution prepared from crystals of fructose obtained from the said purified syrup, since a certain amount of color is removed during the crystallization procedure. For example, it is possible for a fructose syrup to have an optical density after autoclaving of about 0.09 when examined in a 1 cm. cell at 350 m$\mu$ and yet produce fructose crystals of sufficiently high purity to enable the preparation of a therapeutic 10% aqueous fructose solution which upon autoclaving has an optical density of about 0.040 or below.

The sugar solutions which are purified in accordance with the teaching of the present invention are prepared by oxidizing a polyhydric sugar alcohol, such as mannitol, by means of an Acetobacter micro-organism which produces an enzyme catalyzing the said oxidation of the alcohol to the corresponding keto sugar. (Iowa State College Journal of Science, 21, 251 (1947).) While several species of the genus Acetobacter catalyze the oxidation of polyhydric sugar alcohols to the corresponding keto sugar, the species *Acetobacter suboxydans* is most effective in oxidizing mannitol to fructose. The particular strain of organism used in the herein disclosed specific examples in *Acetobacter suboxydans* NRRL B-72.

The cultures of *Acetobacter suboxydans* NRRL B-72 are prepared by transferring half of an agar slant into 125 ml. of an aqueous culture medium comprising 7% mannitol, 0.5% yeast extract, and 0.005% potassium acid phosphate contained in a 500 ml. Erlenmeyer flask. A second flask is inoculated in the foregoing manner and each culture is grown in shaken culture for 24 hours and the contents transferred to a 12-liter bubble bottle containing 10 liters of an aqueous medium comprising 5% mannitol and 0.25% yeast extract. The cells in the bubble bottle are cultured for 24 hours at a temperature of 28° C.

The vegetative inoculum used to inoculate the fermenter in which the mannitol or other polyhydroxy sugar alcohol is converted into fructose or other corresponding keto sugar is prepared by transferring the entire contents of the bubble bottle cultured in the foregoing manner into a 50 gallon seed tank containing 30 gallons of an aqueous medium comprising 18% mannitol and 0.25% yeast extract. The inoculated medium is cultured at 28° C. for about 20-24 hours with an oxygen transfer rate of 2.5. The fermenter inoculum should comprise about 10% of the fermenter medium which is comprised of sterile water containing about 18% mannitol and about 0.5% of a yeast product, such as dry brewers yeast, yeast extract, or the like, preferably with 0.05% potassium acid phosphate, each of said percentages being based on a weight per volume basis.

The following specific examples are for the purpose of illustrating the present invention and should not be construed so as to be limited to the particular amounts specified therein.

EXAMPLE I

A 50 gallon fermenter containing 30 gallons of a fermentation medium consisting of 20% mannitol, 0.5% dry yeast (type 2019 yeast—Standard Brands) and having a pH of 6.0 is inoculated with 10 liters of a vegetative inoculum comprising *Acetobacter suboxydans* NRRL B-72, prepared in the aforementioned manner, and allowed to ferment as specified herein at a temperature of about 28° C. for a period of about 24 hours. After fermenting about 24 hours an additional 10% mannitol is added to the fermenter and the medium allowed to ferment until all the mannitol is converted to fructose, a condition which is attained after fermenting about 69 hours. To the fermentation beer thus produced is added about 1% of a finely divided diatomaceous earth (Celite #545) and about 1% decolorizing carbon (Nuchar C-190-N) and the beer filtered to remove solids therefrom and color bodies produced during the fermentation process.

Two liters of the filtered fructose solution is passed through a 30 mm. (I. D.) glass column containing a bed of IR-112 cation exchange resin having a particle size of about 35 mesh and having a depth of 40 cm. so as to provide a 260 ml. cation exchange resin volume and about 250 milli-equivalents ion capacity. The IR-112 cation exchange resin is subjected to a preliminary treatment with 1 N sulfuric acid and washed with distilled water. The fructose solution after passing through the foregoing cation exchange resin column is then passed through an anion exchange resin column comprising a glass column having a 30 mm. I. D. and containing the anion exchange resin IRA-400 having an average particle size of about 30 mesh and having a bed depth of about 45 cm. to give a 300 ml. resin volume with a capacity of about 600 milli-equivalents. The IRA-400 anion exchange resin is subjected to a preliminary treatment by passing one liter of 1 N sulfuric acid therethrough followed by washing with one liter of distilled water and thereafter passing sufficient 0.5 N sodium hydroxide therethrough to convert the resin to its free base form. The anion exchange resin is finally washed with at least 1.5 liters of distilled water to remove all traces of sodium hydroxide. The fructose solution is passed through the cation exchange resin (IR-112) at a rate of about 30-40 ml. per minute and the effluent from the cation exchange resin column is passed through the anion exchange resin (IRA-400) at a rate of 40 ml. per minute. Thereafter, the effluent from the anion exchange resin is autoclaved in a glass container at a temperature of 114° C. for a period of 30 minutes during which the fructose solution darkens appreciably. The heat treated fructose solution is then cooled to room temperature and passed through the said anion exchange resin column at a rate of about 40 ml. per minute and finally through the said cation exchange resin column at the said rate of 40 ml. per minute, each of said columns being reactivated prior to passing the cooled autoclaved solution therethrough.

At each step of processing, the fructose solution is examined to determine the optical density of the solution in a 1 cm. cell with light having wave length of 350 mμ. Also, a portion of the fructose solution after passing through the final cation exchange resin column is adjusted to 10% fructose concentration and autoclaved for 20 minutes at 114° C. and the optical density of the solution determined so as to evaluate the completeness of the removal of color bodies therefrom and the effectiveness of the purification process. A summary of the readings obtained on the fructose solution at the specified step in the foregoing example is given in Table I:

*Table I*

| Solution | O. D. 350 mμ |
|---|---|
| After IR-112 | .085 |
| After IRA-400 | .008 |
| After autoclaving | 0.98 |
| After IRA-400 | .013 |
| After IR-112 | .008 |
| 10% fructose syrup autoclaved 20 min. at 114° C | .030 |

It will be apparent from the data in the foregoing table that the fructose solution after autoclaving for 20 minutes at 114° C. is substantially colorless and entirely acceptable for preparing crystalline fructose suitable for pharmaceutical use.

EXAMPLE II

A fructose beer prepared as in Example I is subjected to the same ion exchange resin treatments and heat treatment as specified in Example I. The fructose solution at each step in the process was examined to determine the optical density in a 1 cm. cell with light having a wave length of 350 mμ, the pH, the optical rotation. Also a portion of the fructose syrup after passing through the final IR-112 column is adjusted to a 10% aqueous fructose solution and autoclaved for 20 minutes at 114° C. and the optical density thereof determined in a 1 cm. cell at 350 mμ. A summary of the readings obtained is given in Table II:

*Table II*

| Solution | pH | O. D. 350 mμ | Ml. Volume | Optical Rotation, Degrees | Grams Fructose | Percent Yield |
|---|---|---|---|---|---|---|
| Beer | 3.5 | | | | | |
| Filtered Beer | 4.1 | .045 | 2,020 | −25.1 | 550 | |
| After IR-112 | 2.3 | .025 | | | | |
| After IRA-400 | 8.1 | .052 | 2,380 | −19.9 | 520 | 95 |
| After Autoclaving | 3.5 | .96 | 2,380 | −19.1 | | |
| After IRA-400 | 8.5 | .030 | | | | |
| After IR-112 | 4.0 | .015 | 2,700 | −16.1 | 475 | 86 |
| Autoclaved 10% Syrup | | .060 | | | | |

The overall yield of fructose in the solution obtained in the foregoing manner with autoclaving is 86% as determined by measuring the optical rotation of the solution.

To recover crystalline fructose in syrup, the fructose solution obtained by the foregoing procedure is evaporated in vacuo on a bath having a temperature of between about 45–50° C. until the solution contains approximately 90% fructose by weight. Thereafter an equal volume of ethyl alcohol (90% ethanol, 5% methanol, 5% water) is added to the concentrated syrup and the mixture stirred with warming until a uniform solution is formed. The solution is then allowed to cool slowly with stirring to a temperature of 40° C. The solution is then seeded with fructose crystals and the fructose readily crystallizes from solution. After allowing the solution to stand with stirring for about 20 hours, the crystals of fructose are separated by filtering and washed with 200 ml. of the ethyl alcohol. After drying under high vacuum, a yield of 75% fructose crystals is obtained based on the optical rotation of the fructose solution. The crystals of fructose obtained in the foregoing manner have the physical properties designated in table II (a):

*Table II (a)*

| | |
|---|---|
| Specific rotation at 23° C | −88.8°. |
| Percent fructose by rotation | 97.7%. |
| Percent fructose by reducing sugar. | 98.2%. |
| Ash | None. |
| Sulfate | <The equivalent of 0.5 ml. N/50 $H_2SO_4$ in 5 grams. |
| Chloride | <The equivalent of 0.5 ml. N/50 HCl in 5 grams. |
| 4-OH-methyl furfural | None. |
| Pyrogen | Passes test. |
| Optical density 350 mμ 1 cm. cell autoclaved 10% solution. | .045. |
| Precipitin 3 rabbits | No fatalities. |
| Anaphylaxis 5 guinea pigs | No fatalities. |
| Acute toxicity in 5 mice 1 ml. 10% solution per 20 gram mouse. | No fatalities. |

When the fructose crystals obtained in the foregoing manner and having the above specified properties are dissolved in water to form a 10% fructose aqueous solution, and heated for 20 minutes at sterilizing temperatures, a water clear solution remains having a maximum optical density at 350 m$\mu$ of 0.040 without any detectable color bodies being formed therein.

EXAMPLE III

A portion of the fructose beer used in Example I is subjected to a treatment with cation and anion exchange resin as in Example I with the rate of flow through the said ion exchange columns being 20 ml. per minute instead of 40 ml. per minute. The absorbance of the respective fructose solutions after the specified treatment is shown in Table III:

Table III

| | Optical density at a flow rate of 20 ml./min. |
|---|---|
| After IR-112 | .042 |
| After IRA-400 | .008 |
| After autoclaving | .55 |
| After IRA-400 | .020 |
| After IR-112 | .009 |
| 10% solution autoclaved 20 minutes at 114° C | .065 |

It is apparent upon comparing the foregoing data in Table III and Table I of Example I that the slower flow rate gives a solution of somewhat deeper color on autoclaving.

The fructose crystals obtained from the fructose syrup produced by the foregoing procedure in which the flow rate is 20 ml. per minute when used to prepare a 10% aqueous fructose solution is capable of being sterilized in the standard manner without the formation of detectable color bodies being formed therein.

EXAMPLE IV

A fructose beer prepared substantially as in Example I containing 18.0% fructose is passed through IR-112 and through Dowex I-X8 at a rate of about 20 cc. per minute with each of said resins packed in a glass column having an I. D. of 30 mm. to a depth of about 40 cm. Thereafter the deionized resin is autoclaved for 30 minutes at a temperature of 114° C. The cooled deionized autoclaved solution is then passed through the series of ion exchange resins comprising Dowex I-X8 and IR-112 in the specified order and having the resin volume specified above to provide a purified deionized fructose solution. The said fructose solution at the specified stage of processing has the physical properties specified in Table IV:

Table IV

| | O. D. 350 m$\mu$ | pH | O. R., Degrees | Volume, cc. | Wt. Fructose, gms. |
|---|---|---|---|---|---|
| At start | .035 | 3.7 | −16.0 [28] | 1980 | 360 |
| After IR-112 | .020 | 4.1 | | | |
| After Dowex I-X8 | .005 | 6.5 | −12.1 [32] | 2330 | 328 |
| After Autoclaving | .179 | | | | |
| After Dowex I-X8 | .010 | 7.8 | −10.8 [29] | 2430 | 300 |
| After IR-112 | .007 | | −9.9 [30] | 2640 | 300 |

The fructose solution produced in the foregoing manner when prepared as a 10% aqueous solution and heated for 20 minutes at sterilizing temperatures (114° C.) exhibits an optical density in a 1 cm. cell of 0.036 at 350 m$\mu$. The fructose crystals obtained from the above series when prepared as a 10% aqueous fructose solution and heated for 20 minutes at sterilizing temperatures form a solution having no objectionable color bodies therein with an optical density in a 1 cm. cell of less than 0.036 at 350 m$\mu$.

EXAMPLE V

A fructose beer prepared as in Example IV containing 18.0% fructose is passed through the series of ion exchange resins comprising IR-112 and Duolite A-41 with each of said resins packed in a glass column having an I. D. of 30 mm. to a depth of about 40 cm. Thereafter the deionized resin is autoclaved for 30 minutes at a temperature of 114° C. The deionized autoclaved solution is then passed through the series of ion exchange resins comprising Duolite A-41 and IR-112 in the specified order and having the resin volume specified above to provide a purified deionized fructose solution. The fructose solution at the various stages of processing has the physical properties specified in Table V:

Table V

| | O. D. 350 m$\mu$ | pH | O. R., Degrees | Volume | Wt. Fructose, gms. |
|---|---|---|---|---|---|
| At start | .035 | 4.0 | −15.7 [29] | 2 liters | 360 |
| After IR-112 | | 2.2 | −13.0 [20] | 2,400 cc | 356 |
| After Duolite A-41 | .092 | 4.6 | −11.4 [29] | 2,660 cc | 347 |
| After autoclaving | .335 | | | | |
| After Duolite A-41 | .010 | 5.9 | −9.9 [30] | 2,790 cc | 318 |
| After IR-112 | .095 | 3.7 | −9.7 [29] | 2,930 cc | 325 |

The fructose solution produced in the foregoing manner when prepared as a 10% aqueous solution and heated for 20 minutes at sterilizing temperatures exhibits an optical density of about 0.10 at 350 m$\mu$ and the fructose crystals obtained from the above series when prepared as a 10% aqueous fructose solution and heated for 20 minutes at sterilizing temperatures forms a solution having no objectionable color bodies therein and an optical density in a 1 cm. cell of about 0.040 at 350 m$\mu$.

EXAMPLE VI

A fructose beer prepared as in Example I containing 18.1% fructose is passed through a series of ion exchange resins consisting of IR-112, IRA-400, and IR-112 in the specified order and having the volume of cation and anion exchange resin in each column as specified in Example I. Thereafter the deionized solution is autoclaved for 30 minutes at a temperature of 114° C. The fructose solution obtained has an optical density of 0.46 with light having a wave length of 350 m$\mu$. The autoclaved fructose solution after cooling is passed through the regenerated IRA-400 anion exchange resin and finally through the regenerated IR-112 cation exchange column. A sample of the said solution adjusted to a 10% concentration of fructose after heating for 20 minutes at sterilizing temperatures exhibits an optical density of 0.056 in a 1 cm. cell at 350 m$\mu$. The yield of fructose obtained after passing through the 5 ion exchange resin columns and autoclaving is 78% calculated on the optical rotation of the said solutions.

The fructose crystals obtained as in Example I when used to prepare a 10% fructose solution exhibit no detectable color when the solution is subjected to heating for 20 minutes at sterilizing temperatures (i. e. optical density at 350 m$\mu$ of about 0.040).

EXAMPLE VII

A fructose beer prepared in the manner specified in Example I and passed through the cation and anion exchange resin columns employed in Example I and autoclaved for a period of 15 minutes at a temperature of 114° C. rather than for a period of 30 minutes as in Example I has the absorbance and pH values at the indicated stage of processing shown in Table VI:

Table VI

| | Absorbance (O. D.) 350 m$\mu$ | pH |
|---|---|---|
| After IR-112 | .010 | 1.9 |
| After IRA-400 | .005 | 7.6 |
| After autoclaving | Not recorded | Not recorded |
| After IRA-400 | .000 | 8.1 |
| After IR-112 | .003 | 4.6 |

The fructose syrup thus produced when concentrated so as to have a fructose concentration of 10% as determined by optical rotation exhibits an absorbance of 0.070 at 350 mμ after autoclaving at sterilizing temperatures for 20 minutes. The fructose crystals obtained from the foregoing solution in the manner specified in Example I produces a clear solution having an optical density of 0.040 at 350 mμ in a 1 cm. cell when prepared as a 10% aqueous solution and heated to sterilizing temperatures for a period of 20 minutes.

EXAMPLE VIII

A fructose beer prepared as specified in Eample I and passed through the ion exchange resin columns specified in Example I but which is autoclaved for one hour at a temperature of 114° C. rather than 30 minutes as specified in Example I exhibits the properties specified in Table VII:

*Table VII*

| | Absorbance (O. D.) 350 mμ | pH | Rotation | Percent Fructose | Ml. Volume | Grams Fructose |
|---|---|---|---|---|---|---|
| Starting beer | .11 | 7.4 | −20.6 | 22.7 | 565 | 128 |
| IR-112 | .007 | | | | | |
| IRA-400 | .002 | 8.5 | −13.6 | | 688 | |
| Autoclaved solution | | 3.5 | −13.2 | | | |
| IRA-400 | .017 | 8.5 | | | | |
| IR-112 | .010 | 5.0 | −8.4 | 9.2 | 1,110 | 102 |

The fructose syrup when adjusted to a concentration of 10% fructose is autoclaved for 20 minutes at sterilizing temperatures and exhibits an absorbance of 0.062 at 350 mμ. The yield of fructose obtained after passing through the four specified ion exchange resin columns and autoclaving is 80%. Fructose crystals obtained from the foregoing fructose syrup produces a clear substantially colorless 10% aqueous solution even after autoclaving for 20 minutes at sterilizing temperatures which has a maximum optical density of 0.050 in a 1 cm. cell at 350 mμ.

EXAMPLE IX

A fructose beer prepared substantially as in Example I which is also filtered through an asbestos filter bed is subjected to treatment with the ion exchange resin column specified in Example I with one portion thereof after passing once through the IR-112 cation exchange resin column and the IRA-400 anion exchange resin column is immediately passed through the regenerated IRA-400 anion exchange resin column and the regenerated IR-112 cation exchange resin column in the specified order without first being subjected to autoclaving or other heat treatment, the remaining portion of the fructose beer being subjected to the standard 30-minute autoclaving treatment at a temperature of 114° C. The fructose beer processed without autoclaving has the properties specified in Table VIII:

*Table VIII*

| | Ab. 350 mμ | pH |
|---|---|---|
| After IR-112 | .030 | 2.1 |
| After IRA-400 | .070 | 9.9 |
| After IR-112 | .045 | 3.8 |
| After IRA-400 | .025 | 9.7 |
| After IR-112 | .014 | 4.3 |
| After autoclaving (10%) | .285 | 3.7 |

The fructose beer processed with the autoclaving step included has the properties specified in Table IX:

*Table IX*

| | Ab. 350 mμ | pH |
|---|---|---|
| After IR-112 | .035 | 2.0 |
| After IRA-400 | .023 | 9.9 |
| After autoclaving | .340 | 3.6 |
| After IRA-400 | .012 | 7.3 |
| After IR-112 | .012 | 4.9 |
| After autoclaving (10%) | .055 | 4.5 |

It is apparent from the data in Tables VIII and IX that a 10% fructose solution obtained from the final IR-112 cation exchange resin column which has been subjected to a heat treatment during the processing thereof has a substantially lower optical density than the same fructose beer processed in the identical manner with the exception that the specified heat treatment is not employed during the processing thereof. The fructose crystals obtained from the foregoing fructose syrup which has been subjected to the heat treatment between the series of deionizing treatments forms a stable water clear 10% fructose solution even after sterilizing for 20 minutes at 114° C., whereas the fructose crystals obtained from the beer not subjected to the heat treatment when prepared as a 10% aqueous solution and sterilized in the above-mentioned manner forms a marked yellow discolored solution which is entirely unacceptable.

EXAMPLE X

A fructose beer prepared substantially as in Example I but which has therein an unusually large amount of potential color forming bodies as evidenced by the treated fructose syrup having after processing precisely as in Example I and heating to a sterilizing temperature an optical density of 0.096 is processed after the usual carbon treatment and filtering by passing first through a glass column containing IRA-400 in the amount specified in Example I and then through a similar glass column containing IR-112 in the amount specified in Example I. Thereafter, the deionized beer having a pH of about 3.2 is autoclaved by heating for 30 minutes at 114° C., whereupon somewhat more color is observed to develop in the autoclaved fructose syrup. The cooled autoclaved solution is then passed twice through the reactivated IRA-400 column and finally through the regenerated IR-112 column. The fructose solution at the specified stage of processing has the properties given in Table X:

*Table X*

| Solution | O. D. 350 mμ | pH | O. R. | Ml. Volume | Wt. Fructose, grams |
|---|---|---|---|---|---|
| At start | .035 | 3.7 | −16.0 | 1,990 | 362 |
| After IRA-400 | 1.05 | 9.9 | −12.7 | 2,360 | 338 |
| After IR-112 | .104 | 3.2 | −11.8 | 2,530 | 334 |
| After autoclaving | 2.00 | | | | |
| After IRA-400 | .083 | | | | |
| After IRA-400 | .033 | 7.3 | | | |
| After IR-112 | .030 | 5.3 | −8.6 | 3,020 | 313 |

When the fructose syrup produced in the above manner is prepared as a 10% aqueous solution and autoclaved in the usual manner to effect sterilization and the solution examined in a 1 cm. cell at 350 mμ the optical density is .087. The crystals obtained therefrom produce an acceptable therapeutic fructose solution. Also, where the original beer contains the normal amount of color bodies, the foregoing purification procedure produces a fructose syrup before crystallization which when prepared as a 10% aqueous solution and autoclaved has an optical density of less than 0.055 when examined in a 1 cm. cell at 350 mμ.

EXAMPLE XI

Two 500 gallon fermenters (Fermenter A and Fermenter B) containing 300 and 350 gallons, respectively, of a fermentation medium consisting of 18% mannitol, 0.5% dry yeast (2019 yeast—Standard Brands), and 0.05 potassium acid phosphate, and having a pH of 6.0 are inoculated with approximately 113 liters of a vegetative inoculum comprising *Acetobacter suboxydans* NRRL B–72, prepared in the herein disclosed manner, are allowed to ferment for about 28 hours at a temperature of about 28° C. at which point substantially all the mannitol is converted to fructose. The fermentation beer thus produced is admixed with 10% of a finely divided diatomaceous earth (Celite #545) and about 1% decolorizing carbon (Nuchar C–190–N) and the beer filtered to remove solids therefrom and color bodies produced during the fermentation process.

The fructose beer obtained in the foregoing manner is then processed by passing through the IR–112 cation exchange resin column having a bed volume of about 15 cubic feet and a depth of 30 inches and the IRA–400 anion exchange resin column having a bed volume of 20 cubic feet and a depth of 38 inches, in the order specified, at a rate of about 9 gallons per minute. The fructose syrup is then subjected to autoclaving in a glass lined container at a temperature of 114° C. for a period of 30 minutes and thereafter passed through the regenerated anion exchange resin column (IRA–400) and the regenerated cation exchange resin column (IR–112) in the specified order at a rate of about 9 gallons per minute. The fructose solutions exhibit the properties set forth in Table XI at the specified stage of processing.

*Table XI*

| Sample | Gal. | pH | O. D. | R. S. | α | Wt. of Reducing sugar (lbs.) |
|---|---|---|---|---|---|---|
| Raw stock | 300 | 3.6 | .102 | 18.6 | 16.4 | 463 |
|  | 350 | 3.6 | .135 | 18.1 | 16.4 | 528 |
| Filtered beer | 500 | 4.0 | .043 | 17.6 | 15.8 | 885 |
|  | 190 | 4.4 | .058 | 9.7 | 8.3 |  |
| IR–112 |  | 2.1 | .017 | 17.4 | 15.6 |  |
| IRA–400 | 475 | 7.2 | .017 | 10.9 | 9.7 | 838 |
|  | 500 | 6.5 | .024 | 9.7 | 8.5 |  |
| Before autoclaving | 365 | 5.9 | .029 | 30.7 | 28.3 | 895 |
| After autoclaving | 325 | 3.5 | .200 | 31.5 | 30.0 | 850 |
| IRA–400 |  | 7.8 | .013 | 30.0 | 26.8 |  |
| IR–112 | 495 | 4.2 | .003 | 16.3 | 14.4 | 822 |
|  | 375 | 4.9 | .062 | 4.7 | 4.2 |  |

A yield of 81% fructose as determined by optical rotation is obtained from the foregoing process. The fructose crystals recovered from the fructose syrup prepared in the foregoing manner when prepared as a 10% aqueous solution provide a clear aqueous solution free of color bodies even after heating for 20 minutes at sterilizing temperatures.

EXAMPLE XII

A fructose beer prepared substantially as in Example I is passed through the sequence of ion exchange resin columns and heat treated as specified in Table XII having the volume and form specified in Example I. The optical density of the fructose solution at the indicated stage of processing is shown in Table XII:

*Table XII*

| Solution | O. D. 350 mμ (1 cm. cell) |
|---|---|
| After IR–120 | 0.075 |
| After IRA–400 | 0.015 |
| After autoclaving at 114° C. for 30 min. | 0.97 |
| After IRA–400 | 0.010 |
| After IR–120 | 0.005 |

The fructose solution processed in the above manner when prepared as a 10% aqueous solution and heated for 20 minutes at sterilizing temperatures (114° C.) exhibits an optical density in a 1 cm. cell of 0.038 and the crystals obtained therefrom are suitable for the preparation of pharmaceutically useful aqueous solutions.

EXAMPLE XIII

A fructose beer prepared substantially as in Example I is passed through the sequence of ion exchange resin columns and heat treated as specified in Table XIII having the volume and form specified in Example I. The optical density of the fructose solution at the indicated stage of processing is shown in Table XIII:

*Table XIII*

| Solution | O. D. 350 mμ (1 cm. cell) |
|---|---|
| After Duolite C–10 | .023 |
| After IRA–400 | .008 |
| After autoclaving at 114° C. for 30 min. | .560 |
| After IRA–400 | .018 |
| After Duolite C–10 | .012 |

The fructose solution processed in the above manner when prepared as a 10% aqueous solution and heated for 20 minutes at sterilizing temperatures (114° C.) exhibits an optical density in a 1 cm. cell of 0.062 and the crystals obtained therefrom are suitable for the preparation of pharmaceutically useful aqueous solutions.

The ion exchange resin treatments and the heat treating step interposed between the resin treatments can be carried out in either a batchwise manner or continuously by having the effluent from one column carried directly to the inlet of the next and adjusting the flow rate through a heating tube so that the period of contact or heating falls within operative limits illustrated in the examples disclosed herein.

While the foregoing specific examples have been concerned with the purification of fructose solutions prepared by oxidizing or fermenting mannitol with *Acetobacter suboxydans*, it should be understood that other sugar solutions prepared by fermenting the corresponding sugar alcohol with *Acetobacter suboxydans* or other species of the genus Acetobacter, such as *Acetobacter xylinum* and *Acetobacter aceti*, can be purified in the same manner as the fructose. Examples of other sugar solutions which can be purified in the foregoing manner are d-xylulose prepared by fermenting d-arabitol with *Acetobacter suboxydans*; l-adonulose prepared by fermenting adonitol (meso) with *Acetobacter suboxydans*; d-fructose prepared by fermenting d-mannitol with *Acetobacter xylinum*; l-sorbose prepared by fermenting sorbitol with *Acetobacter suboxydans* or *Acetobacter xylinum*; l-allulose prepared by fermenting allitol (meso) with *Acetobacter xylinum*; and volemulose prepared by fermenting d-volemitol with *Acetobacter xylinum*. It is thus possible to purify and stabilize the color of a wide variety of sugar solutions prepared by the oxidation of sugar alcohols including pentitols, hexitols, and heptitols as well as higher sugar alcohols by means of Acetobacter microorganisms. It is therefore possible to produce on both a laboratory and commercial scale sugar solutions or crystalline sugars of high purity and color stability by a relatively simple and inexpensive method which heretofore were obtainable only with great difficulty and expense.

It should also be understood that in addition to the herein disclosed method of improving the color stability of sugar solution, other purification or decolorization treatments can be used, such as contacting the sugar solution with decolorizing carbon or similar decolorizing agents, at any stage in the herein disclosed method and such added treatment does not circumvent nor interfere with the present process involving contacting the sugar solution at least twice with both a strongly basic anion exchange resin and a strongly acidic cation exchange resin with a heat treatment sufficient to cause a substantial proportion of the potential color body formers to form color bodies in the said solution but without destroying an appreciable amount of the said sugar in solution.

Others may readily adapt the invention for use under various conditions of service, by employing one or more of the novel features disclosed or equivalents thereof. As at present advised with respect to the apparent scope of our invention, we desire to claim the following subject matter.

We claim:

1. A method of purifying sugar solutions to improve the color stability thereof which comprises treating a sugar solution containing color body formers produced by fermenting a polyhydric alcohol in the presence of an Acetobacter microorganism by intimately contacting with ion exchange resins including a strongly basic anion exchange resin and a strongly acidic cation exchange resin; heating the said resin treated solution at a temperature of at least about 100° C. and below the temperature which adversely affects the said sugar in solution, to form a substantial number of color bodies in the said solution without destroying an appreciable amount of the said sugar in solution; and thereafter again contacting the sugar solution with ion exchange resins comprising a strongly basic anion exchange resin and a strongly acidic cation exchange resin; whereby a substantial proportion of the impurities responsible for forming color bodies in the said sugar solution upon sterilizing aqueous solutions thereof are removed.

2. A method of purifying sugar solutions to improve the color stability thereof which comprises treating a sugar solution containing color body formers produced by fermenting a polyhydric alcohol in the presence of an Acetobacter microorganism by intimately contacting with ion exchange resins including a strongly basic anion exchange resin containing quaternary ammonium groups and a cation exchange resin which is sulfonated to provide said resin with strongly acidic properties; heating the said resin treated solution to a temperature at least about 100° C. and below a temperature at which the concentration of the said sugar in solution is appreciably lowered for a period of at least about 15 minutes and not substantially in excess of one hour, whereby a substantial number of color bodies are formed therein without destroying an appreciable amount of the said sugar in solution; and thereafter again contacting the said sugar solution with a strongly basic anion exchange resin containing quaternary ammonium groups and a cation exchange resin which is sulfonated to provide the said resin with strongly acidic properties; whereby a substantial proportion of the impurities responsible for the formation of color bodies in the said sugar solution on sterilizing aqueous solutions thereof are removed.

3. A method of purifying sugar solutions to improve the color stability thereof which comprises treating a sugar solution containing color body formers produced by fermenting a polyhydric alcohol in the presence of an Acetobacter microorganism by intimately contacting with a cation exchange resin which is sulfonated to provide said resin with strongly acidic properties and thereafter with a strongly basic anion exchange resin containing quaternary ammonium groups; heating the said resin treated solution to a temperature at least about 100° C. and below a temperature at which the concentration of the said sugar in solution is appreciably lowered for a period of at least about 15 minutes and not substantially in excess of one hour, whereby a substantial number of color bodies are formed therein without destroying an appreciable amount of the said sugar in solution; and thereafter contacting the said sugar solution with a strongly basic anion exchange resin containing quaternary ammonium groups; and finally contacting the said sugar solution with a cation exchange resin which is sulfonated to provide said resin with strongly acidic properties; whereby a substantial proportion of the impurities responsible for the formation of color bodies in the said sugar solution on sterilizing aqueous solutions thereof are removed.

4. A process of purifying sugar solutions substantially as in claim 3 wherein the said sugar solution is heated to a temperature of about 114° C. for a period of about 30 minutes.

5. A method of purifying a fructose solution to improve the color stability thereof which comprises treating a fructose solution containing color body formers produced when fermenting mannitol in the presence of an Acetobacter microorganism by intimately contacting with a sulfonated copolymerized styrene-divinyl benzene cation exchange resin and a quaternized haloalkylated copolymerized styrene-divinyl benzene anion exchange resin; heating the said resin treated solution to a temperature at least about 100° C. and below a temperature at which the concentration of the said fructose in solution is appreciably lowered for a period of at least about 15 minutes and not substantially in excess of one hour, whereby a substantial number of color bodies are formed therein without destroying an appreciable amount of the said fructose in solution; thereafter contacting the said fructose solution with a quaternized haloalkylated copolymerized styrene-divinyl benzene anion exchange resin; and finally contacting the said fructose solution with a sulfonated copolymerized styrene-divinyl benzene cation exchange resin to provide the solution with a pH of about 3.5; whereby a substantial proportion of the impurities responsible for the formation of color bodies in the said fructose solution on sterilizing aqueous solutions thereof are removed.

6. A method of purifying a fructose solution to improve the color stability thereof which comprises treating a fructose solution containing color body formers produced by fermenting mannitol in the presence of an *Acetobacter suboxydans* microorganism by intimately contacting with a cation exchange resin comprising a sulfonated copolymerized styrene-divinyl benzene and thereafter intimately contacting with an anion exchange resin comprising a chlormethylated copolymerized styrene-divinyl benzene anion exchange resin quaternized by treatment with triethylamine; heating the said fructose solution to a temperature of about 114° C. for a period of about 30 minutes, whereby a substantial number of color bodies are formed therein without destroying an appreciable amount of the said fructose in solution; thereafter contacting the said fructose solution with a chlormethylated copolymerized styrene-divinyl benzene anion exchange resin quaternized by reacting with triethylamine; and finally contacting the said fructose solution with a sulfonated copolymerized styrene-divinyl benzene cation exchange resin having strongly acidic properties to provide the said fructose solution with a pH of about 3.5; whereby a substantial proportion of the impurities responsible for the formation of color bodies in the said fructose solution on sterilizing aqueous solutions thereof are removed.

References Cited in the file of this patent

UNITED STATES PATENTS

| | | |
|---|---|---|
| 2,228,514 | Griessbach | Jan. 14, 1941 |
| 2,534,694 | Blaun | Dec. 19, 1950 |
| 2,578,937 | Kumir | Dec. 18, 1951 |
| 2,594,440 | Hughes | Apr. 29, 1952 |
| 2,606,847 | Newkirk | Aug. 12, 1952 |
| 2,635,061 | McBurney | Apr. 14, 1953 |